Patented June 30, 1936

2,046,181

UNITED STATES PATENT OFFICE 2,046,181

INSECTICIDE AND FUNGICIDE

Theron Palmer Remy, Los Angeles, Calif., assignor to The Texas Company, New York, N. Y., a corporation of Delaware No Drawing. Application November 19, 1932, Serial No. 643,541

9 Claims. (Cl. 167—24)

This invention relates to insecticides and fungicides and more particularly to insecticides and fungicides containing toxic compounds extracted from the flowers, leaves and seeds of the verbasci members of the Scrophulariaceæ.

It is an object of the invention to prepare an insecticide and fungicide containing toxic principles extracted from certain members of the verbasci family, principally from the flowers, leaves and seeds of the common mullein plant.

It is another object of the invention to prepare an insecticide which is extremely toxic to insect life and their larvæ but which is harmless to animal life when inspired.

I have found that there is present in varying amounts in the leaves, flowers and seeds of the common mullein, an extractable material having extremely potent insecticidal and fungicidal properties. The constitution of this active principle is unknown but it appears to consist of certain glucosides and saponin-like compounds.

These active principles may be recovered to a limited extent by extracting the leaves or flowers or seeds of the mullein plant with water. However, I have found that they may be most economically and efficiently recovered by treating the plants or their parts with selective solvents such as ethers, ketones, aldehydes, esters, hydrocarbons or their derivatives. The specific principles do not appear to deteriorate appreciably upon drying the plants or the various parts of the plants and I have found that they may be recovered from the dried flowers, leaves and seeds after these have been in storage for a considerable length of time. It appears however that the most efficient method of extracting these principles consists in gathering either the entire plant or its flowers when it has reached maturity or when it is with seed, crushing it by any advantageous method and then extracting with the proper solvent. The extracts prepared in this manner are then separated from the solvent by a distillation which may be carried out under vacuum.

The residue remaining after the distillation is a dark viscous liquid having a distinctive odor.

It is readily miscible with most of the common solvents such as petroleum ether, ethyl ether, alcohol, acetone, ethylene dichloride and most other organic solvents. With kerosene, the mullein extract yields a solution having a yellow color which is extremely active insecticidally and, when the solution is atomized to form a fog, it is capable of killing all of the common insects, larvæ and fungi.

Although I have found that the active principles present in the mullein plants may be quantitatively extracted with most of the well-known organic solvents, I have found that by using kerosene or a petroleum hydrocarbon oil of similar characteristics as a solvent, that an efficient insecticide and fungicide may be produced directly. The procedure used is as follows: The flowers are gathered, then crushed and ground to a pulp at normal temperatures. A sample of the crushed material is withdrawn and assayed to determine the content of toxic principles. With this information, the quantity of kerosene extractant may then be determined.

The proper quantity of kerosene is mixed with the mullein flower pulp and the resultant mixture is agitated for a considerable length of time after which it is allowed to remain quiescent to permit the water and kerosene layers to stratify whereupon the supernatant kerosene layer is withdrawn. Under certain circumstances, it may be desirable to repeat the extraction with fresh quantities of kerosene or petroleum hydrocarbon oil and this procedure may be repeated until three or four extractions have been made.

The kerosene extracts are joined and this solution is allowed to settle to permit plant matter and water to precipitate whereupon it is filtered to clarify it. It is then tested to determine its toxic qualities and adjustments in the concentrations may be made by the addition of mullein flower extract or kerosene.

I have found that when mullein extract is incorporated with oil and water emulsions, an extremely efficient insecticide is obtained. In preparing these emulsions of mullein extract, hydrocarbon oil and water, varying emulsifying agents may be used with advantage. Among these may be enumerated the alkali metal salts of the various fatty acids as well as of the naphthenic acids recovered from petroleum. Soaps of triethanolamine, finely divided adsorbent material such as fuller's earth, bentonite and the like, as well as those gums which are well-known as suitable stabilizing agents, may also be used. As an example of a suitable insecticidal emulsion base which may be diluted with from 50 to 100 parts of water is as follows:

| | Percent |
|---|---|
| Mullein extract | 5 |
| Light lubricating oil | 70 |
| Sodium naphthenate | 5 |
| Water | 20 |

An insecticide suitable for use as a fly-spray may have the following composition:

| | Percent |
|---|---|
| Refined kerosene | 99.9 |
| Mullein extract | 0.1 |

In certain cases especially where large areas are to be subjected to treatment with insecticides, the use of sprays and emulsions may be out of the question and in these cases I have found that the problem is most advantageously solved by using a mullein extract dust insecticide. These are prepared by causing a certain amount of mullein flower extract to become adsorbed by a finely divided solid adsorbent such as fuller's earth, charcoal or the like. These dusts are perfectly dry and may be applied to the plant life by the usual dusting methods which may include scattering from a low flying aeroplane.

Obviously many modifications and variations of the invention, as hereinbefore set forth, may be made without departing from the spirit and scope thereof, and therefore only such limitations should be imposed as are indicated in the appended claims.

I claim:

1. An insecticide and fungicide comprising a solution of the oil soluble principles of common mullein in a petroleum hydrocarbon oil.

2. An insecticide and fungicide comprising a petroleum hydrocarbon oil, water, oil soluble principles of common mullein and an emulsifying agent.

3. An insecticide and fungicide comprising oil soluble principles of common mullein, petroleum hydrocarbon oil, water, a finely divided solid emulsifying agent.

4. An insecticide and fungicide emulsion containing from 0.5% to 0.02% of an insecticide base consisting of the oil soluble principles of common mullein, petroleum hydrocarbon oil, emulsifying agent and from 90% to 99.5% of water.

5. A fumigant and atomizable insecticide and fungicide comprising a kerosene solution of the oil soluble principles of common mullein.

6. A fly spray comprising from 99.0% to 99.9% of kerosene and from 0.1% to 1.0% of the oil soluble principles of common mullein.

7. An insecticide and fungicide emulsion containing from 0.5% to 10% of an insecticide base consisting of oil soluble principles of common mullein, petroleum hydrocarbon oil, fuller's earth and from 90% to 99.5% of water.

8. A live stock spray comprising oil soluble principles of common mullein and a lubricating oil.

9. An insecticide and fungicide in the form of a dry dust comprising a finely divided adsorbent material and oil soluble principles of common mullein.

THERON PALMER REMY.